(12) United States Patent
Kotera

(10) Patent No.: US 10,320,964 B2
(45) Date of Patent: Jun. 11, 2019

(54) HANDS-FREE CONTROL APPARATUS

(71) Applicant: Mitsubishi Electric Corporation, Tokyo (JP)

(72) Inventor: Hironori Kotera, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/759,122

(22) PCT Filed: Oct. 30, 2015

(86) PCT No.: PCT/JP2015/080754
§ 371 (c)(1),
(2) Date: Mar. 9, 2018

(87) PCT Pub. No.: WO2017/072958
PCT Pub. Date: May 4, 2017

(65) Prior Publication Data
US 2018/0288205 A1  Oct. 4, 2018

(51) Int. Cl.
H04M 1/60 (2006.01)
H04R 1/40 (2006.01)
H04S 7/00 (2006.01)
G10L 21/0232 (2013.01)

(52) U.S. Cl.
CPC ....... *H04M 1/6075* (2013.01); *G10L 21/0232* (2013.01); *H04M 1/60* (2013.01); *H04M 1/605* (2013.01); *H04R 1/406* (2013.01); *H04R 2499/13* (2013.01); *H04S 7/303* (2013.01)

(58) Field of Classification Search
CPC . H04M 1/6075; H04M 1/605; G10L 21/0232; H04R 1/406
See application file for complete search history.

(56) References Cited

U.S. PATENT DOCUMENTS

| | | | |
|---|---|---|---|
| 7,319,962 B2 * | 1/2008 | Goedeke | A61N 1/37247 704/275 |
| 7,457,757 B1 * | 11/2008 | McNeill | G10L 21/0208 704/500 |
| 7,688,986 B2 | 3/2010 | Ito et al. | |
| 9,215,527 B1 * | 12/2015 | Saric | H04R 3/005 |
| 2005/0240401 A1 * | 10/2005 | Ebenezer | G10L 21/0208 704/226 |

(Continued)

FOREIGN PATENT DOCUMENTS

| | | |
|---|---|---|
| JP | 2007-174155 A | 7/2007 |
| JP | 2014-17645 A | 1/2014 |

OTHER PUBLICATIONS

International Search Report issued in PCT/JP2015/080754 (PCT/ISA/210), dated Dec. 8, 2015.

(Continued)

*Primary Examiner* — Lewis G West

(74) *Attorney, Agent, or Firm* — Birch, Stewart, Kolasch & Birch, LLP

(57) ABSTRACT

Characteristics of noise contained in input signals of a plurality of microphones are adjusted to be equal to each other at each frequency, and an input signal of a microphone identified to be a microphone through which a speaker has input uttered speech from among the microphones subjected to adjustment of the noise characteristics is switched to a signal to be transmitted to a person on another end of call.

7 Claims, 4 Drawing Sheets

(56) References Cited

U.S. PATENT DOCUMENTS

| | | | |
|---|---|---|---|
| 2007/0160240 A1 | 7/2007 | Ito et al. | |
| 2009/0299742 A1* | 12/2009 | Toman | G10L 21/0208 704/233 |
| 2010/0150372 A1* | 6/2010 | Ito | H04S 7/303 381/77 |
| 2010/0296659 A1* | 11/2010 | Tanaka | B62J 3/00 381/57 |
| 2011/0246192 A1* | 10/2011 | Homma | G10L 25/69 704/228 |
| 2012/0076316 A1* | 3/2012 | Zhu | H04R 3/005 381/71.11 |
| 2012/0084084 A1* | 4/2012 | Zhu | G10L 21/0208 704/233 |
| 2012/0203557 A1* | 8/2012 | Odinak | G01C 21/3608 704/270.1 |
| 2013/0158989 A1* | 6/2013 | Song | G10L 21/0232 704/226 |
| 2013/0315403 A1 | 11/2013 | Samuelsson | |
| 2015/0125011 A1 | 5/2015 | Sekiya | |
| 2018/0047410 A1* | 2/2018 | Von Bulow | G10L 21/0232 |

OTHER PUBLICATIONS

Office Action issued in German Application No. 11 2015 006 987.9 dated Sep. 10, 2018.

\* cited by examiner

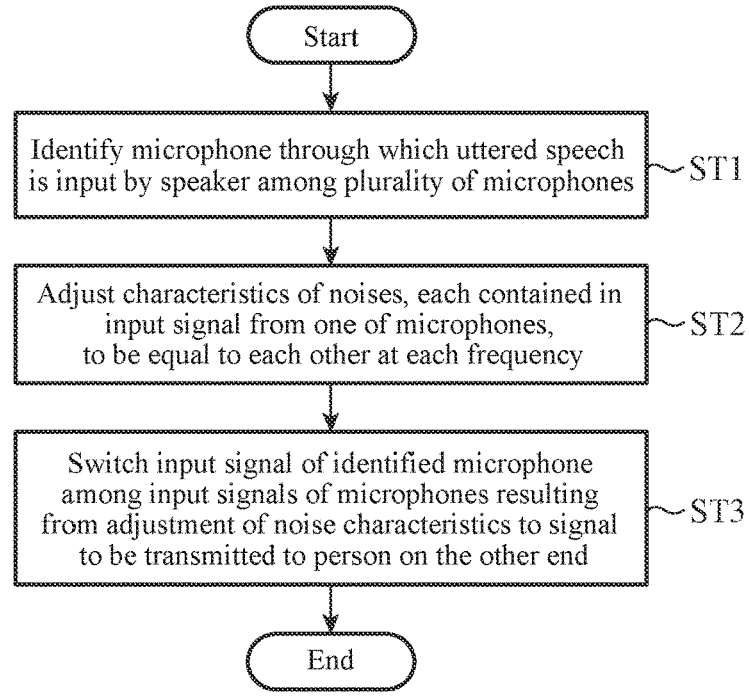
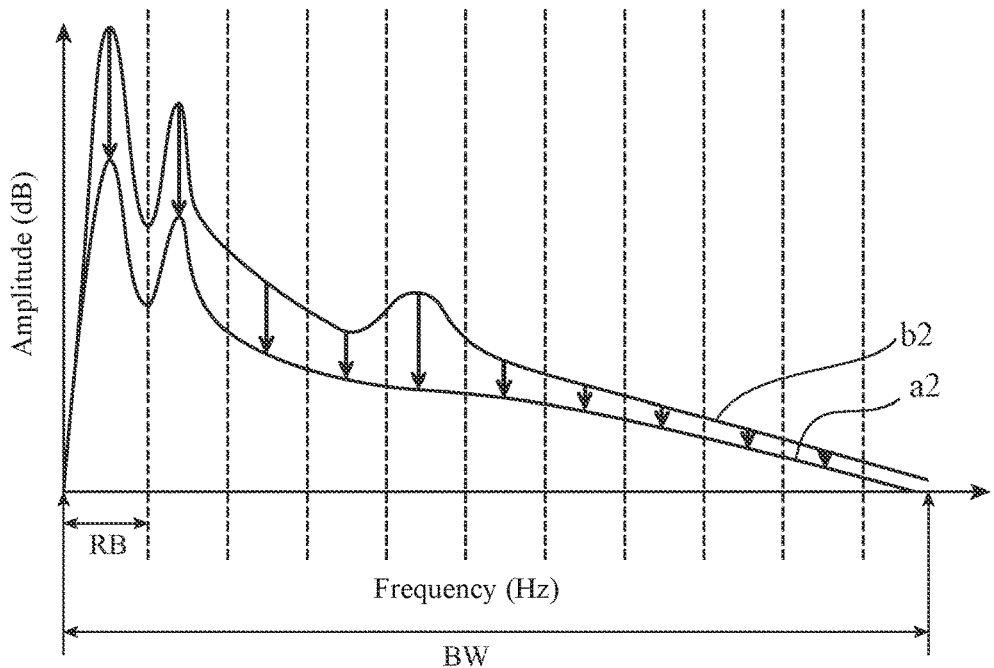

HANDS-FREE CONTROL APPARATUS

TECHNICAL FIELD

The present disclosure relates to a hands-free control apparatus for identifying from among a plurality of microphones a microphone through which a speaker inputs uttered speech, and performing control so that an input signal of the identified microphone is transmitted to a person on another end of call.

BACKGROUND ART

In recent years, hands-free call systems, which allow drivers to speak over mobile phones without holding a mobile phone in their hands, have become common. In addition, in a hands-free call system, use of a plurality of microphones allows a plurality of speakers to talk with a person at far end. In this case, to transmit clearly speech that is uttered and captured to a person on the other end, the microphone through which the speaker inputs uttered speech needs to be properly identified.

For example, Patent Literature 1 discloses a technique for identifying a microphone through which a speaker inputs uttered speech from among a plurality of microphones. In the system disclosed in Patent Literature 1, a microphone whose input level has continued to be above a threshold value for not shorter than a predetermined time period after input of uttered speech by a speaker is identified as a microphone associated with the position of the speaker from among a plurality of microphones. Use of this identifying method in a hands-free call system allows a microphone through which a speaker has input uttered speech to be appropriately identified from among a plurality of microphones.

In addition, in the system disclosed in Patent Literature 1, a background noise level in the vicinity of each microphone is measured in advance, the background noise levels of the respective microphones are corrected to match a background noise level in a whole room, and a microphone associated with the position of a speaker is then identified. This allows identification that is not affected by the background noise levels of the respective microphones.

CITATION LIST

Patent Literature

Patent Literature 1: JP 2007-174155 A

SUMMARY OF INVENTION

Technical Problem

In a hands-free call system mounted on a vehicle, road noise generated during traveling of the vehicle is input to each of a plurality of microphones, and speech containing road noise is transmitted to the person on the other end of call. In this case, since noise characteristics of noise that is input to the microphones, such as gain or frequency characteristics, are different among the microphones, there has been such a problem that, when the speaker has changed and the input signal of a microphone has thus changed, the quality of noise heard by the person on the other end significantly changes to cause the person to experience discomfort.

For example, in a case in which microphones are also used for a function other than hands-free call, such as speech recognition or active noise control (ANC), the acoustic characteristics of the microphones may vary depending on the functions being used and the installation positions. In this case, the noise characteristics also vary depending on the acoustic characteristics. Thus, when an input signal of a microphone to be transmitted to a telephone of the person on the other end is switched, the quality of noise heard by the person on the other end will change significantly.

In addition, in a case in which a plurality of microphones are used for hands-free call, when speech processing performed on an input signal is different, the characteristics of noise contained in the input signal resulting from the speech processing will be different accordingly. Furthermore, even in a case in which microphones having the same acoustic characteristics are used for the plurality of microphones but there are individual differences in gain, frequency characteristics, temperature characteristics, and the like among the microphones, the characteristics of noise contained in input signals of the microphones are also different accordingly.

Thus, in these cases as well, when an input signal of a microphone to be transmitted to a telephone of the person on the other end is switched, the quality of noise heard by the person on the other end will change significantly.

Note that, in the system disclosed in Patent Literature 1, correction to match the background noise levels of the respective microphones with the background noise level in the whole room is performed on the input signals as described above. Thus, it is expected that the change in the quality of noise heard by the person on the other end will be reduced even when the input signal of a microphone to be heard by the person is switched, by transmitting a corrected signal to the telephone of the person.

The background noise levels of the microphones in Patent Literature 1 are, however, obtained by measurement of the levels of background noise present in the vicinity of the respective microphones performed in advance, and assumed to be in an environment in which noise changes little.

In contrast, in a case of a vehicle, road noise is generated while the vehicle is traveling, for example. Road noise is noise caused by friction between tire surfaces and a road surface, and the state of road noise varies significantly depending on the conditions of road surfaces. For example, road noise is generated mainly in a low frequency band, and the noise levels in respective frequencies dynamically and significantly vary depending on whether the road surface is dry or wet.

Thus, in a hands-free call system mounted on a vehicle, the characteristics of noise contained in input signals of respective microphones cannot be adjusted to match with each other by the correction of background noise as disclosed in Patent Literature 1.

Thus, when an input signal of a microphone to be transmitted to a telephone of a person on the other end is switched, the quality of noise heard by the person on the other end will still change significantly.

Embodiments of the present disclosure has been made to solve the aforementioned problems, and an object thereof is to achieve a hands-free control apparatus capable of reducing a change in the quality of noise to be heard by a person on another end of call when an input signal of a microphone to be transmitted to a telephone of the person is switched.

Solution to Problem

A hands-free control apparatus according to the present disclosure includes an identifying unit, a noise characteristics adjusting unit, and a switching unit. The identifying unit identifies from among a plurality of microphones a microphone through which a speaker inputs uttered speech. The noise characteristics adjusting unit adjusts characteristics of noises, each contained in an input signal of one of the plurality of microphones, to be equal to each other at each frequency. The switching unit switches an input signal of the microphone identified by the identifying unit among the input signals of the plurality of microphones whose noise characteristics are adjusted by the noise characteristics adjusting unit, to a signal to be transmitted to a person on another end of call.

Advantageous Effects of Invention

According to an aspect of embodiments of the present disclosure, the characteristics of noise contained in input signals of microphones are adjusted to be equal to each other at each frequency, which reduces a change in the quality of noise to be heard by a person on another end of call when an input signal of a microphone to be transmitted to a telephone of the person is switched.

BRIEF DESCRIPTION OF DRAWINGS

FIG. 4 is a flowchart illustrating operation of the hands-free control apparatus according to First Embodiment.

FIG. 5 is a schematic diagram illustrating adjustment of noise characteristics according to First Embodiment.

DESCRIPTION OF EMBODIMENTS

Hereinafter, to explain this disclosure in more detail, embodiments of this disclosure are described with reference to the accompanying drawings.

First Embodiment

Figure 1:
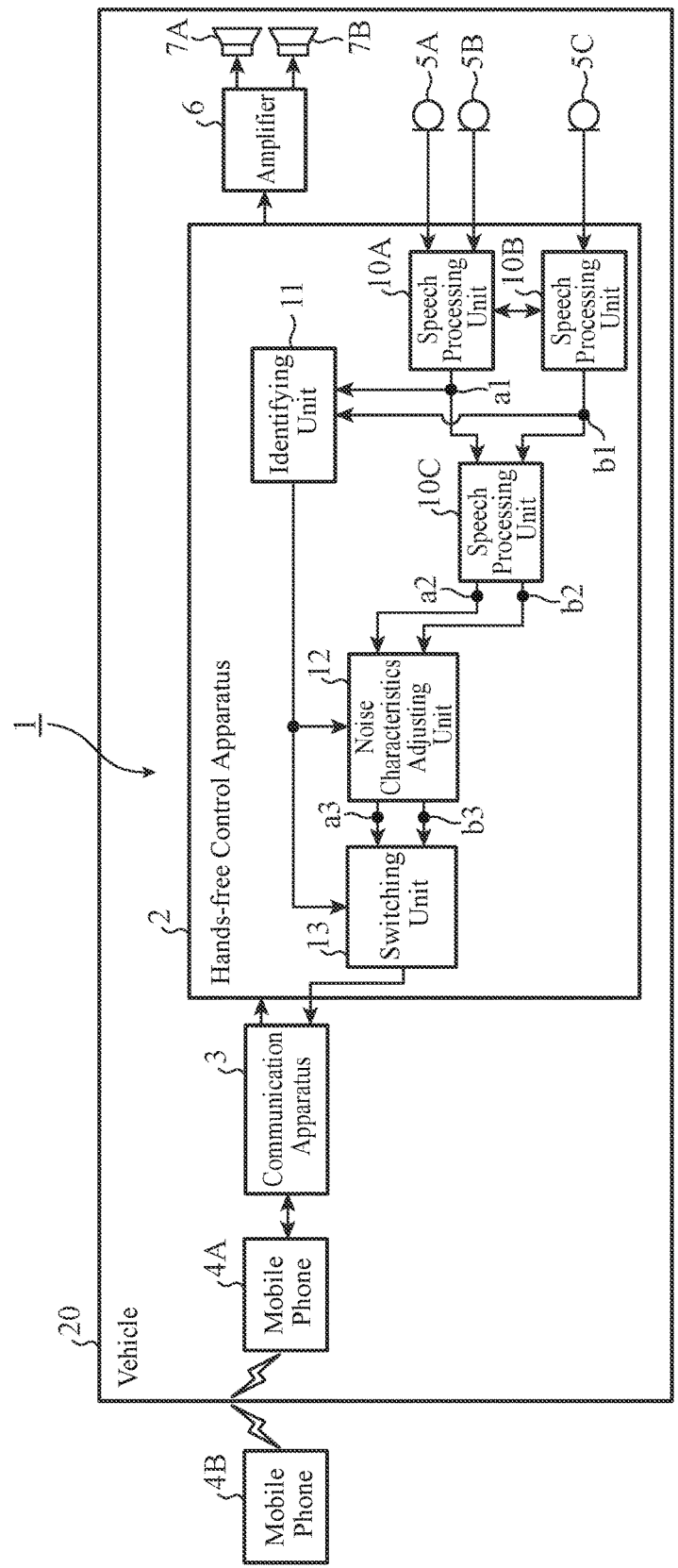
FIG. 1 is a block diagram illustrating a configuration of a hands-free call system including a hands-free control apparatus according to First Embodiment of the present disclosure.

FIG. 1 is a block diagram illustrating a configuration of a hands-free call system 1 including a hands-free control apparatus 2 according to First Embodiment of the present disclosure.

Figure 2:
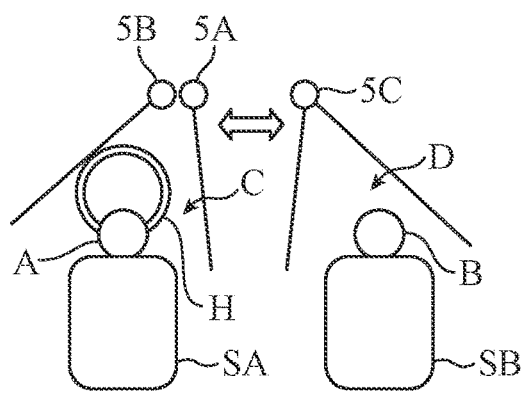
FIG. 2 is a schematic diagram illustrating a hands-free call involving a plurality of speakers.

FIG. 2 is a schematic diagram illustrating a hands-free call involving a plurality of speakers. In FIG. 2, an occupant A seated on a driver's seat SA and an occupant B seated on a front passenger's seat SB are present as speakers in the hands-free call system 1 illustrated in FIG. 1. Microphones 5A and 5B capture speech uttered by the occupant A, while a microphone 5C captures speech uttered by the occupant B.

While a case in which two microphones are provided on the driver's seat SA side and one microphone is provided on the front passenger's seat SB side is illustrated as an example in FIG. 2, any combination of the number and the characteristics of microphones may be employed.

As illustrated in FIG. 1, the hands-free call system 1 is a system that is mounted on a vehicle 20 and performs a hands-free call between a person on the vehicle 20 and a person on the other end of the call outside of the vehicle 20. The hands-free call system 1 is configured to include a hands-free control apparatus 2, a communication apparatus 3, a mobile phone 4A on the vehicle 20, microphones 5A to 5C, an amplifier 6, and loudspeakers 7A and 7B.

The communication apparatus 3 is an apparatus for performing radio communication with the mobile phone 4A brought in the vehicle 20. As a method for performing radio communication, a short-range radio communication method supporting Bluetooth (registered trademark), for example, is used.

The communication apparatus 3 connects to and communicates with the mobile phone 4A by using a hands-free communication protocol.

The mobile phone 4A performs communication with the mobile phone 4B at far end over a mobile phone line. For example, the mobile phone 4A transmits a speech signal of the speaker received from the communication apparatus 3 to the mobile phone 4B over the mobile phone line. In contrast, upon receiving a speech signal of a speaker from the mobile phone 4B on the other end over the mobile phone line, the mobile phone 4A transmits the speech signal to the communication apparatus 3 by using the hands-free communication protocol.

The microphones 5A to 5C are microphones installed in the interior of the vehicle 20, and are used for a hands-free call to collect speech uttered by a speaker, for example. Note that the microphones 5A to 5C are assumed to have the following functions in the description below.

The microphones 5A and 5B are installed on the driver's seat SA side in the vehicle interior, and constitute stereo microphones using both of the microphones 5A and 5B. The microphones 5A and 5B are microphones are directional microphones for capturing the speech uttered by the occupant A seated on the driver's seat SA (a driver operating a steering wheel H, for example). In FIG. 2, a sound collecting area of the microphones 5A and 5B is represented by an area C.

In addition, the microphone 5C is an omnidirectional microphone installed on the front passenger's seat SB seat side to capture the speech uttered by the occupant B seated on the front passenger's seat SB. In FIG. 2, a sound collecting area of the microphone 5C is represented by an area D. Alternatively, all of the microphones 5A to 5C may be omnidirectional microphones.

The amplifier 6 is an amplifier for amplifying a signal of speech that is uttered by the person on the other end of call. The speech is received by the mobile phone 4A and input into the amplifier 6 via the communication apparatus 3.

The loudspeakers 7A and 7B are installed in the interior of the vehicle 20. The signal of the speech uttered by the person on the other end is amplified by the amplifier 6, and output through the loudspeakers 7A and 7B.

The hands-free control apparatus 2 identifies one or more microphones through which speech uttered by a speaker on the vehicle 20 is input from among the microphones 5A to 5C, and outputs an input signal from the identified one or more microphones to the communication apparatus 3. The configuration of the hands-free control apparatus 2 includes speech processing units 10A to 10C, an identifying unit 11, a noise characteristics adjusting unit 12, and a switching unit 13.

The speech processing units 10A to 10C are processors for performing audio processing of signals input from the microphones 5A to 5C. The speech processing unit 10A performs audio processing on speech signals of speech captured by the microphones 5A and 5B on the driver's seat SA side, and the speech processing unit 10B performs audio processing on speech signals of speech captured by the microphone 5C on the front passenger's seat SB side. The speech processing units 10A and 10B perform beam forming, echo cancellation, and level correction, for example, on the input speech signals.

Beam forming is processing for emphasizing only speech coming from the position of the speaker (driver) in speech signals of speech captured by the microphones 5A and 5B. For example, speech signals of speech captured by the microphones 5A and 5B are delayed and combined, and the level of the combined signal is detected on the basis of a delay time provided in advance for each position. A position associated with a delay time with the highest level is then determined to be the position of the occupant A. The position of the occupant A is located in this manner and a speech signal from the direction of the occupant A is emphasized, which improves the signal to noise (SN) ratio of the uttered speech. Note that, in FIG. 1, beam forming is performed only by the speech processing unit 10A for processing speech input from the microphones 5A and 5B.

Echo cancellation is processing for canceling echoes of the speech that is uttered by a person on the other end and captured by the microphones 5A to 5C. For example, by using an adaptive filter, an impulse response between the loudspeakers 7A and 7B and the microphones 5A to 5C is learned, a pseudo echo is generated by convoluting the learned impulse response and the speech signals output from the loudspeakers 7A and 7B, and the pseudo echo is subtracted from the speech input to the microphones 5A to 5C with the assumption that the pseudo echo is a voice that is output from the loudspeakers 7A and 7B and added to the microphones 5A to 5C. Thus, echoes are canceled.

Level correction is processing for correcting a difference in signal level caused by the characteristics of the microphones 5A to 5C. The characteristics of microphones 5A to 5C include errors caused by gain for input signal, frequency characteristics, directionality, and individual differences of respective microphones.

In level correction, for example, speech levels of the microphones 5A to 5C are compared by supposing background noise levels thereof are 0, and they are corrected to be equal to each other.

As a result of the processing, speech signals a1 and b1 from the speech processing units 10A and 10B are signals obtained by canceling differences in level caused by the microphone characteristics in speech signals of speech uttered by the occupant A or the occupant B.

In addition, the speech processing unit 10C performs noise cancellation, correction of frequency characteristics, automatic gain control (hereinafter referred to as AGC), and limiter processing, for example, on signals input from the speech processing units 10A and 10B.

Noise cancellation is processing for reducing the levels of noises contained in input signals of the microphones 5A to 5C by a predetermined level. For example, noise is reduced in such a manner that signals obtained by inverting the phase of noise contained in the input signal of each of the microphone 5A to 5C are generated and combined with the input signals. Alternatively, noise may be reduced in such a manner that transfer function characteristics are given to the input signals of the microphones 5A to 5C.

Note that the processing reduces the noise level in the input signals of the microphones 5A to 5C, but also deteriorates the quality of uttered speech when the degree of cancellation is excessively high. Thus, noise audible to a person on another end remains in the input signals resulting from noise cancellation.

Correction of frequency characteristics is processing for correcting the levels and the phases of input signals of the microphones 5A to 5C at each frequency depending on a space in the vicinity of the microphones 5A and 5B and a space in the vicinity of the microphone 5C, which are reproduction spaces. Since the microphones 5A to 5C are installed at different positions in the vehicle interior as described above, the transmission characteristics of sound due to reflection or absorption of sound are different between the space in the vicinity of the microphones 5A and 5B and the space in the vicinity of the microphone 5C. When the transmission characteristics are different among different reproduction spaces as described above, the levels and the phases at respective frequencies of uttered speech to be transmitted to a person on the other end change, and the audio quality is deteriorated.

Thus, the speech processing unit 10C performs correction of frequency characteristics on signals in the frequency band corresponding to the uttered speech of the input signals of the microphones 5A to 5C, so as to prevent deterioration in the audio quality due to the reproduction spaces.

AGC is processing for performing gain adjustment of input signals of the microphones 5A to 5C.

For example, a reference input level is preset in the speech processing unit 10C, and when the levels of input signals of the microphones 5A to 5C are lower than the reference input level, the speech processing unit 10C determines the input signals to be in a silent period and automatically performs adjustment to reduce the gains of the input signals. In contrast, when the levels of the input signals are not lower than the reference input level, the speech processing unit 10C automatically adjusts the gains to slightly lower the levels of the input signals so that the volumes of the input signals will not become excessively high.

Limiter processing is processing for limiting an input signal with a signal level higher than a threshold level to be not higher than the threshold level among input signals of the microphones 5A to 5C.

For example, as a result of limiting the signal level of an input signal higher than the threshold level to the threshold level, the signal levels of speech signals a2 and b2 from the speech processing unit 10C become not higher than the threshold level. This prevents deterioration in audio quality caused by an input signal having a high signal level occurring unexpectedly.

Note that the speech processing units 10A to 10C may be functions of a speech processing apparatus separate from the hands-free control apparatus 2. In this case, the hands-free control apparatus 2 includes the identifying unit 11, the noise characteristics adjusting unit 12, and the switching unit 13, in which the identifying unit 11 and the noise characteristics adjusting unit 12 receive input of speech signals from the speech processing apparatus as appropriate and perform processing thereon.

The identifying unit 11 identifies one or more microphones through which a speaker has input uttered speech from among the microphones 5A to 5C. For example, the identifying unit 11 receives the speech signal a1 from the speech processing unit 10A and the speech signal b1 from the speech processing unit 10B. The identifying unit 11 then compares a threshold level provided in advance in association with the microphones 5A and 5B with the signal level of the speech signal a1, and compares a threshold level provided in advance in association with the microphone 5C with the signal level of the speech signal b1. The identifying unit 11 selects a signal having a signal level higher than the threshold level and having the higher signal level of the speech signals a1 and b1 as a result of the comparison, and identifies one or more microphones from which the selected output signal is obtained as the microphone(s) through which the speaker has input the uttered speech.

The noise characteristics adjusting unit 12 adjusts the characteristics of noises contained in the input signals of the microphones 5A to 5C to be equal to each other at each frequency.

For example, the noise characteristics adjusting unit performs fast Fourier transform (FFT) on the speech signals a2 and b2 from the speech processing unit 10C to obtain frequency spectra of the speech signals a2 and b2.

The noise characteristics adjusting unit 12 then sets a low frequency band corresponding to road noise in the frequency spectra of the speech signals a2 and b2, to a frequency band for adjustment.

Thereafter, the noise characteristics adjusting unit 12 adjusts the amplitude levels of noise in each frequency width preset in the frequency band subjected to adjustment so that the characteristics of noise contained in the speech signals a2 and b2 match with each other.

Note that, when the signal to be transmitted to the person on the other end is to be switched from the input signal (speech signal a3) of the microphones 5A and 5B to the input signal (speech signal b3) of the microphone 5C, the characteristic of noise contained in the speech signal b3 is adjusted to match the characteristic of noise contained in the speech signal a3.

This reduces a change in the quality of noise to be heard by the person on the other end when an input signal of a microphone to be transmitted to the mobile phone 4B of the person is switched.

The switching unit 13 switches an input signal of the microphone identified by the identifying unit 11, among the input signals of the microphones 5A to 5C resulting from adjustment of noise characteristics by the noise characteristics adjusting unit 12, to be a signal to be transmitted to a person on the other end as shown by a double-headed arrow in FIG. 2.

For example, the switching unit 13 includes a switch for switching to either of speech signals a3 and b3 from the noise characteristics adjusting unit 12 and outputs the signal to the communication apparatus 3. The switching unit 13 outputs the speech signal a3 to the communication apparatus 3 when the microphones 5A and 5B are identified by the identifying unit 11, or outputs the speech signal b3 to the communication apparatus 3 when the microphone 5C is identified by the identifying unit 11.

Figure 3A:
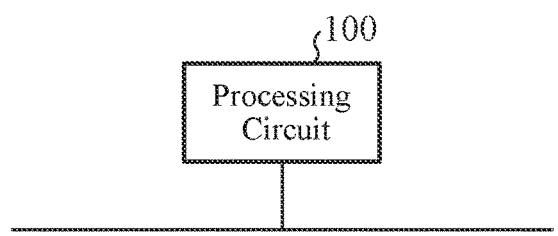
FIG. 3A is a diagram illustrating a hardware configuration for implementing the functions of the hands-free control apparatus according to First Embodiment.
Figure 3B:
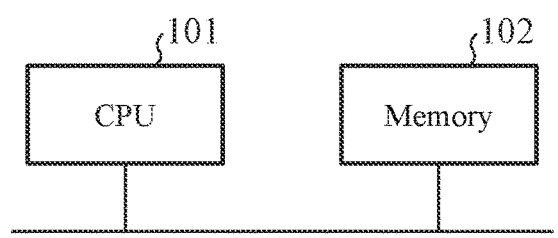
FIG. 3B is a diagram illustrating a hardware configuration for executing software implementing the functions of the hands-free control apparatus according to First Embodiment.

FIG. 3A is a diagram illustrating a hardware configuration for implementing the functions of the hands-free control apparatus 2 according to First Embodiment, and FIG. 3B is a diagram illustrating a hardware configuration for executing software implementing the functions of the hands-free control apparatus 2 according to First Embodiment.

The functions of the speech processing units 10A to 10C, the identifying unit 11, the noise characteristics adjusting unit 12, and the switching unit 13 in the hands-free control apparatus 2 are implemented by a processing circuit.

Specifically, the hands-free control apparatus 2 includes processing circuitry for performing processes from step ST1 to step ST3 illustrated in FIG. 3, which will be described later.

The processing circuitry may include dedicated hardware, or a central processing unit (CPU) for reading and executing programs stored in a memory.

In a case in which the processing circuitry is implemented by processing circuitry 100 that is dedicated hardware as illustrated in FIG. 3A, the processing circuitry 100 may be a single circuit, a composite circuit, a programmed processor, a parallel-programmed processor, an application specific integrated circuit (ASIC), a field-programmable gate array (FPGA), or a combination thereof, for example.

The functions of respective units including the speech processing units 10A to 100, the identifying unit 11, the noise characteristics adjusting unit 12, and the switching unit 13 may be implemented by respective processing circuits, or may be implemented by integrating them into one processing circuit.

In a case in which the processing circuitry is a CPU 101 as illustrated in FIG. 3B, the functions of the speech processing units 10A to 10C, the identifying unit 11, the noise characteristics adjusting unit 12, and the switching unit 13 are implemented by software, firmware, or combination of software and firmware.

The software and firmware are described in the form of programs and stored in a memory 102. The CPU 101 implements the functions of the respective units by reading and executing the programs stored in the memory 102. Thus, the hands-free control apparatus 2 includes the memory 102 for storing programs, which, when executed by the CPU 101, results in execution of the steps illustrated in FIG. 4. Note that these programs cause a computer to execute the procedures or the methods of the speech processing units 10A to 10C, the identifying unit 11, the noise characteristics adjusting unit 12, and the switching unit 13.

Note that the memory includes nonvolatile or volatile semiconductor memory such as a random access memory (RAM), a ROM, a flash memory, an erasable programmable ROM (EPROM), or an electrically EPROM (EEPROM), a magnetic disk, a flexible disk, an optical disk, a compact disc, a mini disc, or a digital versatile disk (DVD), for example.

Alternatively, some of the functions of the speech processing units 10A to 10C, the identifying unit 11, the noise characteristics adjusting unit 12, and the switching unit 13 may be implemented by dedicated hardware, and others may be implemented by software or firmware.

For example, the processing circuitry 100 that is dedicated hardware implements the functions of the speech processing units 10A to 10C, while the CPU 101 implements the functions of the identifying unit 11, the noise characteristics adjusting unit 12, and the switching unit 13 by executing programs stored in the memory 102.

As described above, the processing circuitry is capable of implementing the above-described functions by hardware, software, firmware, or combination thereof.

Next, operation will be explained.

FIG. 4 is a flowchart illustrating operation of the hands-free control apparatus 2 according to First Embodiment, and illustrates a series of processes from identifying the microphone through which a speaker has input uttered speech to switching a signal to be transmitted to a person on the other end. Note that the processes from step ST1 to step ST3 illustrated in FIG. 4 are repeated.

First, the identifying unit 11 compares the signal level of the speech signal a1 with the threshold level associated with the microphones 5A and 5B, and compares the signal level of the speech signal b1 with the threshold level associated with the microphone 5C. The identifying unit 11 then selects a signal having a signal level higher than the threshold level and having the higher signal level of the speech signals a1 and b1, and identifies the microphone from which the selected output signal is obtained as the microphone through which the speaker has input the uttered speech (step ST1).

While the case in which the identifying unit 11 compares the signal levels (absolute speech amplitudes) of input signals of the microphones 5A to 5C to identify a microphone has been presented in the description above, a microphone may be identified on the basis of relative comparison of input signals of the microphones 5A to 5C using the background noise levels.

For example, the identifying unit 11 may compare signal levels obtained by subtracting the background noise levels from the signal levels of input signals of the microphones 5A to 5C to identify the microphone through which a speaker has input uttered speech.

Even when microphones having the same characteristic are used for the microphones 5A to 5C, errors due to individual differences occur in practice. Thus, although the speech level of the occupant A is higher than that of the occupant B illustrated in FIG. 2, the magnitudes of the absolute speech amplitudes of the input signals may be reversed owing to the errors and the microphone 5C may be identified as the microphone through which a speaker has input uttered speech.

The identifying unit 11 therefore compares signal levels obtained by subtracting the background noise levels from the signal levels of the input signals of the microphones 5A to 5C.

Relative comparison of the input signals of the microphones 5A to 5C using the background noise levels in this manner prevents erroneous determination caused by the individual differences of the microphones 5A to 5C.

Alternatively, when a difference between the signal levels obtained by subtracting the background noise levels from the signal levels of the input signals is equal to or larger than a predetermined value as a result of comparison therebetween, the microphone from which the input signal having the larger signal level is obtained may be identified as the microphone through which a speaker has input uttered speech.

For example, a case in which the signal level obtained by subtracting the background noise level from the signal level of an input signal of the microphones 5A and 5B is 60 dB and the signal level obtained by subtracting the background noise level from the signal level of an input signal of the microphone 5C is 59 dB will be described.

Here, when the predetermined value is 10 dB, the input signal of the speaker microphones 5A and 5B will not be switched to a signal to be transmitted even when the microphone 5C is selected as the microphone through which a speaker has input uttered speech since the difference between the signal levels is 1 dB.

In contrast, when the signal level obtained by subtracting the background noise level from the signal level of the input signal of the microphone 5C is 50 dB, the input signal of the microphones 5A and 5B is switched to a signal to be transmitted.

In this manner, switching is not performed when the difference is within a margin of error, which improves the reliability of the processing of the identifying unit 11.

Alternatively, SN ratios may be compared instead of the signal levels for identification of a microphone.

For example, comparison similar to the case of signal levels is performed by using an SN ratio of the microphones 5A and 5B and a corresponding threshold used for the SN ratio of the microphones 5A and 5B, and an SN ratio of the microphone 5C and a corresponding threshold used for the SN ratio of the microphone 5C.

As described above, the difference in level between the speech signals a1 and b1 caused by the microphone characteristics is canceled. Comparison of such speech signals a1 and b1 allows the microphone through which a speaker has input uttered speech to be appropriately identified.

Note that in the identifying unit 11 the thresholds of signal levels or the thresholds of the SN ratios as described above may be variable. For example, a value input by a user may be set as a threshold.

Alternatively, for example, a time average of differences in signal level or SN level is observed, and a value obtained by adding a specific offset to the time average is used as a threshold. When the average of differences between the SN ratio of the microphones 5A and 5B and the SN ratio of the microphone 5C while the occupant A talks is 7 dB, 4 dB obtained by subtracting an offset value of 3 dB from 7 dB is used as a threshold. The thresholds may be dynamically changed in this manner.

Alternatively, until a predetermined retention time elapses since the signal level of an input signal of a microphone identified as the microphone through which a speaker input uttered speech became not higher than the signal level of an input signal of another microphone, the identifying unit 11 may not identify the other microphone as the microphone through which the speaker inputs uttered speech. For example, even when the signal level of the speech signal a1 becomes not higher than the signal level of the speech signal b1 resulting from the input signal of the microphone 5C after the microphones 5A and 5B are identified as the microphones through which the speaker has input uttered speech, the signal to be output to the communication apparatus 3 is not switched from the speech signal a3 to the speech signal b3 until the retention time elapses.

In this manner, since the signal to be output to the communication apparatus 3, that is, the signal to be transmitted to the person on the other end is prevented from being frequently switched, which enables switching when it is certainly determined that the speaker has changed. Note that an example of the retention time may be a period of about several hundred milliseconds.

Furthermore, when the signal level of one of the speech signals a1 and b1 is smaller than a lower limit threshold, the identifying unit 11 may determine that the speech signal is silent and identify the microphone from which the other speech signal is obtained as the microphone through which a speaker has input uttered speech. For example, when the signal level of the speech signal a1 is determined to be a silent level, the microphone 5C from which the speech signal b1 is obtained is identified as the microphone through which a speaker has input uttered speech. As a result, the signal to be transmitted to the person on the other end is automatically switched from the speech signal a3 to the speech signal b3. This also allows the microphone through which a speaker has input uttered speech to be appropriately identified.

Subsequently, the noise characteristics adjusting unit 12 adjusts the characteristics of noises, each contained in an input signal of one of the microphones 5A to 5C, to be equal to each other at each frequency (step ST2).

For example, the noise characteristics adjusting unit 12 performs fast Fourier transform (FFT) on the speech signals a2 and b2 to obtain frequency spectra of the speech signals a2 and b2.

The noise characteristics adjusting unit 12 then sets a low frequency band corresponding to road noise in the frequency spectra of the speech signals a2 and b2 to a frequency band BW for adjustment as illustrated in FIG. 5. Thereafter, the noise characteristics adjusting unit 12 adjusts the amplitude levels of noise in each preset frequency width RB so that the characteristics of noise contained in the speech signals a2 and b2 match each other in the frequency band BW subjected to adjustment as shown by an arrow in FIG. 5.

In this manner, the characteristics of noises contained in the speech signals a3 and b3 from the noise characteristics adjusting unit 12 become equal to each other, even when either speech signal a3 or b3 is switched to the signal to be transmitted to the person on the other end, a change in the quality of noise heard by the person on the other end can be reduced between before and after switching.

While the case in which only the frequency band corresponding to noise is set to be the frequency band BW subjected to adjustment has been presented, a frequency band of uttered speech may also be subjected to adjustment.

For example, in a case in which the difference between noise and uttered speech is not clear, the characteristics of the uttered speech and the noise are made equal to each other. This also reduces a change in the quality of noise heard by the person on the other end between before and after the switching.

Figure 6:
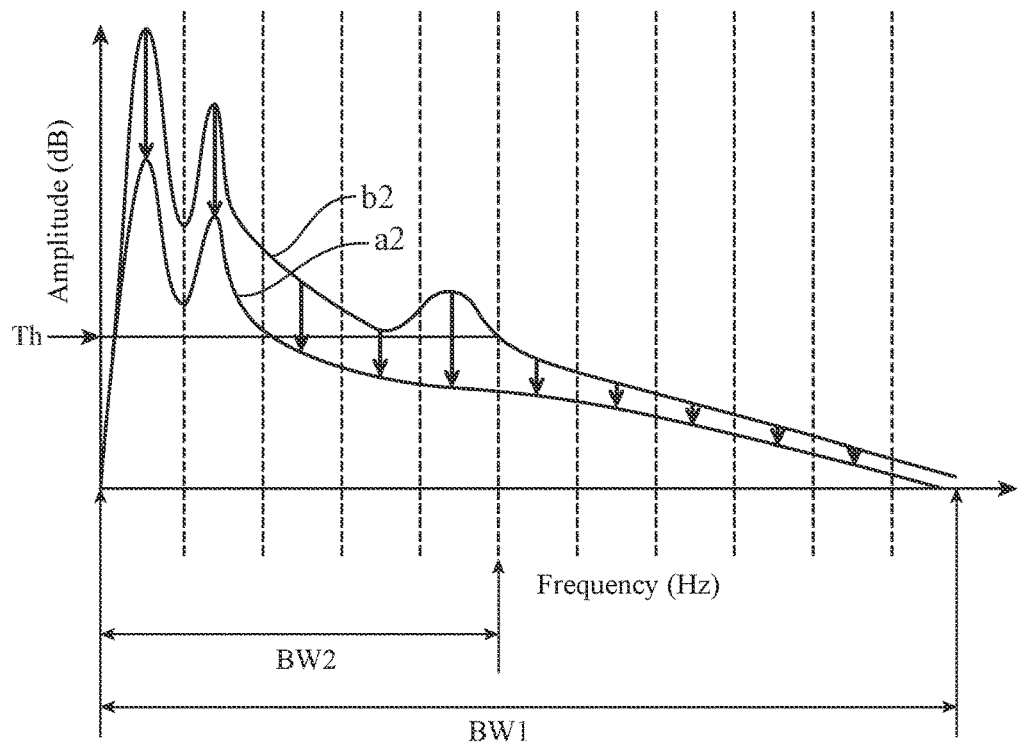
FIG. 6 is a graph illustrating a case in which a frequency band subjected to adjustment of noise characteristics is changed.

In addition, the noise characteristics adjusting unit 12 may be capable of changing the frequency band BW subjected to adjustment. For example, as illustrated in FIG. 6, a frequency band BW1 for adjustment is set, and only a frequency band BW2 in which the level of noise contained in either of the speech signals a2 and b2 exceeds a threshold level Th is then changed to a frequency band for adjustment. The threshold level Th is set to be a lower limit level audible to the person on the other end, which allows only a frequency band in which adjustment of noise characteristics is necessary to be selected as the frequency band for adjustment, and allows the noise characteristics to be appropriately made equal to each other.

Further, examples of noise generated during traveling of a vehicle include, for example, pattern noise and cavernous resonance, other than road noise. Pattern noise is noise generated by compression and release of air in/from tire grooves, which is in a higher sound range than road noise. Cavernous resonance is noise generated by vibration of air filling tires, which is also a dry sound in a higher sound range than road noise.

Thus, for also making the characteristics of such noise other than road noise equal, the noise characteristics adjusting unit 12 sets components in a higher frequency band corresponding to pattern noise and cavernous resonance to be the frequency band BW for adjustment.

This allows the characteristics of noise to be appropriately made equal to each other depending on the actual noise environment.

Furthermore, the noise characteristics adjusting unit 12 may be capable of changing the frequency width RB.

For example, in a traveling environment in which the level of road noise is not lower than a threshold, the frequency width RB is uniformly narrowed so that the characteristics of noise can be finely adjusted. In contrast, in a traveling environment in which the level of road noise is lower than the threshold, the frequency width RB is uniformly widened to reduce the computation load of the adjustment.

This allows the characteristics of noise to be appropriately made equal to each other.

Note that the frequency width RB may be changed not only to a constant width but also to different widths.

Figure 7:
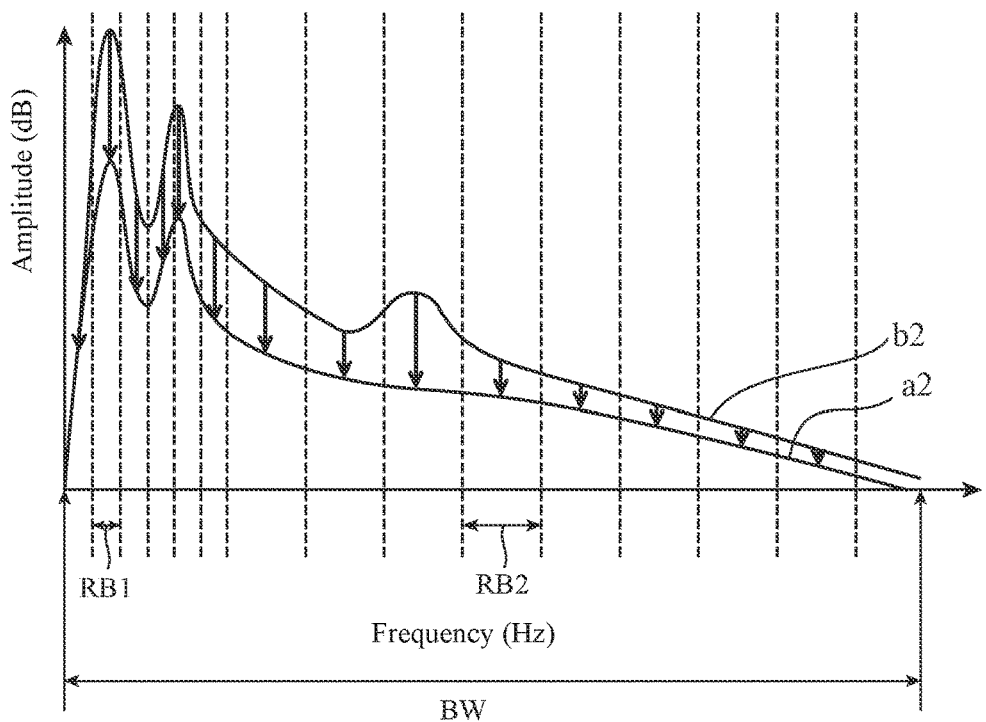
FIG. 7 is a graph illustrating a case in which a frequency width subjected to adjustment of noise characteristics is changed.

For example, as illustrated in FIG. 7, the frequency width is narrowed from a frequency width RB2 to a frequency width RB1 in a frequency band in which the amount of change in noise level is larger than a predetermined threshold within the frequency band BW subjected to adjustment. This allows fine adjustment of the characteristics in a section in which the noise level changes greatly, and appropriately eliminates a difference in noise characteristics between the speech signals a2 and b2.

Subsequently, the switching unit 13 switches an input signal of the microphone identified by the identifying unit 11, among the input signals of the microphones 5A to 5C resulting from adjustment of noise characteristics by the noise characteristics adjusting unit 12, to be a signal to be transmitted to a person on another end of call (step ST3).

For example, the speech signal a3 is output to the communication apparatus 3 when the microphones 5A and 5B are identified by the identifying unit 11, or the speech signal b3 is output to the communication apparatus 3 when the microphone 5C is identified by the identifying unit 11.

The communication apparatus 3 transmits the speech signal input from the switching unit 13 to the mobile phone 4A through short-range radio communication. The mobile phone 4A transmits a speech signal to the mobile phone 4B over the mobile phone line. As a result, the person on the other end can hear the uttered speech of the speaker in the vehicle 20.

As described above, the hands-free control apparatus 2 according to First Embodiment has the configuration illustrated in FIG. 1, and adjusts the characteristics of noises contained input signals of the microphones 5A to 5C to be equal to each other at each frequency. This configuration reduces a change in the quality of noise heard by the person on the other end when input signals of the microphones 5A to 5C to be transmitted to the mobile phone 4B of the person are switched.

In addition, in the hands-free control apparatus 2 according to First Embodiment, the identifying unit 11 identifies the microphone through which the speaker has input the uttered speech by comparing signal levels obtained by subtracting background noise levels from signal levels of the input signals of the microphones 5A to 5C. This configuration prevents erroneous determination caused by individual differences of the microphones 5A to 5C.

Furthermore, in the hands-free control apparatus 2 according to First Embodiment, the noise characteristics adjusting unit 12 adjusts the characteristics of noises contained in input signals for each preset frequency width RB in the frequency band BW subjected to adjustment. This reduces a change in the quality of noise heard by the person on the other end between before and after switching even when either of the speech signals a3 and b3 is switched to a signal to be transmitted to the person on the other end.

Furthermore, in the hands-free control apparatus 2 according to First Embodiment, the frequency band BW set for adjustment by the noise characteristics adjusting unit 12 is changeable. This allows the characteristics of noise to be appropriately made equal to each other.

Furthermore, in the hands-free control apparatus 2 according to First Embodiment, the frequency width RB is changeable. This allows the characteristics of noise to be appropriately made equal to each other.

Furthermore, in the hands-free control apparatus 2 according to First Embodiment, the noise characteristics adjusting unit 12 narrows the frequency width RB in a frequency band in which the amount of change in noise level is larger than a predetermined threshold within the frequency band BW subjected to adjustment.

This allows fine adjustment of the characteristics in a section in which the noise level changes greatly, and appropriately eliminates a difference in noise characteristics between the speech signals a2 and b2.

Furthermore, in the hands-free control apparatus 2 according to First Embodiment, until a predetermined retention time elapses since the signal level of an input signal of a microphone identified as the microphone through which a speaker input uttered speech became not higher than the signal level of an input signal of another microphone, the identifying unit 11 does not identify the other microphone as the microphone through which a speaker has input uttered speech. This prevents frequent switching of the signal to be transmitted to a person on another end, and enables switching when it is certainly determined that the speaker has changed.

Note that within the scope of the present invention any components in the embodiments can be modified or and any components in the embodiments can be omitted.

INDUSTRIAL APPLICABILITY

A hands-free control apparatus according to the present disclosure is capable of reducing a change in perceived noise quality due to switching of input signals of microphones, which is suitable for a hands-free call system to be mounted on a vehicle.

REFERENCE SIGNS LIST

1: hands-free call system, 2: hands-free control apparatus, 3: communication apparatus, 4A, 4B: mobile phone, 5A to 5C: microphone, 6: amplifier, 7A, 7B: loudspeaker, 10A to 10C: speech processing unit, 11: identifying unit, 12: noise characteristics adjusting unit, 13: switching unit, 20: vehicle, 100: processing circuitry, 101: CPU, 102: memory.

The invention claimed is:

1. A hands-free control apparatus comprising:
 processing circuitry
  to identify from among a plurality of microphones a microphone through which a speaker inputs uttered speech;
  to adjust characteristics of noises, each contained in an input signal of one of the plurality of microphones, to be equal to each other at each frequency; and
  to switch an input signal of the identified microphone among the input signals of the plurality of microphones whose noise characteristics are adjusted, to a signal to be transmitted to a person on another end of call.

2. The hands-free control apparatus according to claim 1, wherein the processing circuitry is configured to identify the microphone through which the speaker inputs the uttered speech by comparing signal levels obtained by subtracting background noise levels from signal levels of the input signals of the plurality of microphones.

3. The hands-free control apparatus according to claim 1, wherein the processing circuitry is configured to adjust the characteristics of the noises contained in the input signals at each preset frequency width in a frequency band to be adjusted.

4. The hands-free control apparatus according to claim 3, wherein the frequency band to be adjusted is changeable.

5. The hands-free control apparatus according to claim 3, wherein the frequency width is changeable.

6. The hands-free control apparatus according to claim 5, wherein the processing circuitry is configured to narrow the frequency width in a frequency band in which an amount of change in noise level is larger than a predetermined threshold within the frequency band to be adjusted.

7. The hands-free control apparatus according to claim 1, wherein when a signal level of an input signal of the identified microphone becomes equal to or less than a signal level of an input signal of another microphone, the processing circuitry is configured not to identify the other microphone as microphone through which the speaker inputs uttered speech until a retention time elapses.

* * * * *